United States Patent
Sills et al.

(10) Patent No.: US 12,174,308 B2
(45) Date of Patent: Dec. 24, 2024

(54) INCREASING WIRELESS NETWORK PERFORMANCE USING CONTEXTUAL FINGERPRINTING

(71) Applicant: Calix, Inc., San Jose, CA (US)

(72) Inventors: Daniel Sills, San Jose, CA (US); Eric Leal, San Jose, CA (US); Gregg Heikkinen, San Jose, CA (US)

(73) Assignee: Calix, Inc., San Jose, CA (US)

( * ) Notice: Subject to any disclaimer, the term of this patent is extended or adjusted under 35 U.S.C. 154(b) by 284 days.

(21) Appl. No.: 17/871,068

(22) Filed: Jul. 22, 2022

(65) Prior Publication Data

US 2024/0027567 A1    Jan. 25, 2024

(51) Int. Cl.
*G01S 5/02* (2010.01)
*H04W 24/08* (2009.01)
*H04W 64/00* (2009.01)

(52) U.S. Cl.
CPC .......... *G01S 5/0252* (2013.01); *H04W 24/08* (2013.01); *H04W 64/00* (2013.01)

(58) Field of Classification Search
CPC .................................................... G01S 5/0252
See application file for complete search history.

(56) References Cited

U.S. PATENT DOCUMENTS

| | | | |
|---|---|---|---|
| 2013/0337829 A1* | 12/2013 | Fix ...................... | H04W 56/005 455/456.1 |
| 2014/0162629 A1* | 6/2014 | Tipton ................ | H04L 12/5692 455/423 |
| 2016/0226892 A1* | 8/2016 | Sen ....................... | H04W 12/02 |
| 2020/0304952 A1* | 9/2020 | Berkovich ............ | H04W 4/029 |

* cited by examiner

*Primary Examiner* — Hsinchun Liao
(74) *Attorney, Agent, or Firm* — Schwegman Lundberg & Woessner, P.A.

(57) ABSTRACT

Systems and techniques for increasing wireless network performance using contextual fingerprinting are described herein. Performance metrics may be obtained for a client device-access radio pair that includes a wireless network interface of a client device and an access radio of a wireless network associated with the client device. A fingerprint may be generated for the client device-access radio pair. The fingerprint may be stored in a fingerprint store for the wireless network.

21 Claims, 6 Drawing Sheets

INCREASING WIRELESS NETWORK PERFORMANCE USING CONTEXTUAL FINGERPRINTING

TECHNICAL FIELD

Embodiments described herein generally relate to wireless computing networks and, in some embodiments, more specifically to increasing wireless network performance using context-specific behavioral fingerprinting.

BACKGROUND

Typical residential-scale home networks may employ a wireless network that may include one or more nodes that support access point (AP) functionality. One AP provides access between clients (e.g., cell phones, computers, streaming devices, etc.) and the internet while additional supporting (e.g., satellite, etc.) APs may be employed to increase a coverage area of the wireless network. Each AP may include multiple radios (e.g., a 2.4 gigahertz radio, a 5 gigahertz radio, a 6 gigahertz radio, a 60 gigahertz radio, etc.) in various combinations.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A network manager (NM) process may be employed to manage various aspects of the network such as which radio a client should connect to in order to maximize client performance or to minimize congestion—too many clients connected to the same radio may degrade the network for all clients. The systems and techniques discussed herein collect and record various metrics specific to a client allowing the NM to fingerprint clients in a context-specific fashion and use the fingerprints to manage the network more efficiently and effectively.

Some solutions for determining a radio connection pair may utilize pre-determined generic performance tables that are client agnostic to approximate performance a client may achieve by connecting to a particular radio of an access point (AP). Generic tables are utilized to estimate typical client behavior on the wireless network. However, generic performance tables may not account for particularities of a given client and its radios including radio performance degradation from radio aging, damage that may have occurred to a radio of a client, etc. Thus, clients may be assigned to radios in a one-size-fits-all fashion that may not result in selection of the most appropriate radio connection for a particular client device.

The systems and techniques discussed herein address the lack of client individualized radio assignments in the conventional radio assignment technique by collecting and recording various metrics specific to each client that is associated to a wireless network. The collected data provides more accurate information regarding how a client operates/performs on the network and may be referenced by a NM process when deciding how to manage clients on the network. The systems and techniques discussed herein track how each client is actually operating/performing while associated on a radio of an AP. The client specific data allows the NM to generate more accurate predictions than generic tables of conventional solutions. Machine learning may be used to learn how different clients perform on different radios enabling better client management decisions by the NM. The learned client behavior (e.g., connection performance, connection reliability, etc.) within the network may be used by the NM process to predict client behavior that may result from client management operations that may assign the client to various radios within the network.

Figure 1:
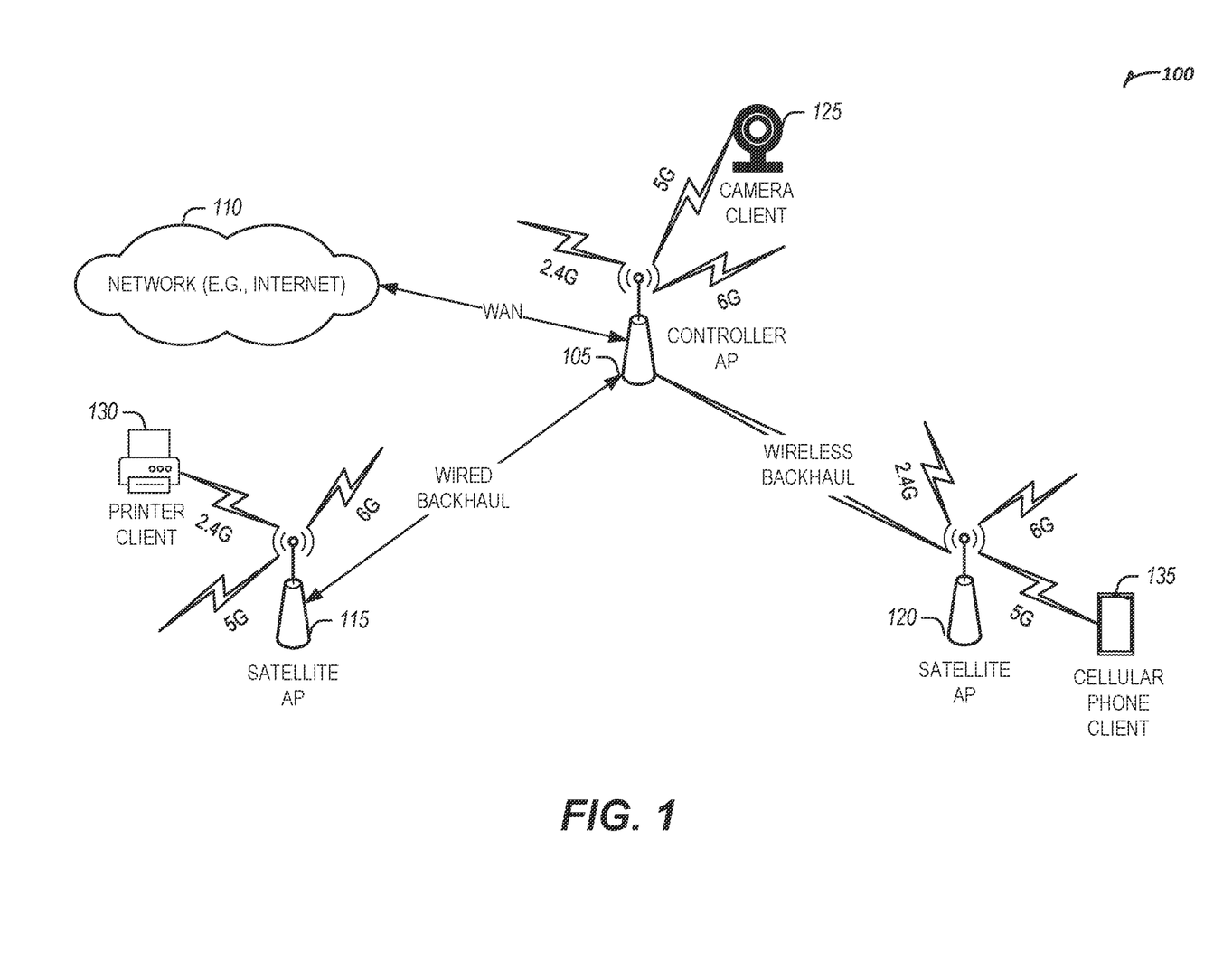
FIG. 1 is a block diagram of an example of a wireless network environment for increasing wireless network performance using contextual fingerprinting, according to an embodiment.

FIG. 1 is a block diagram of an example of a wireless network 100 environment for increasing wireless network performance using contextual fingerprinting, according to an embodiment. The wireless network 100 may include a controller access point (AP) 105 that is connected to a wide area network (WAN) 110 (e.g., the internet, etc.). The controller AP 105 may be connected to a first satellite AP 115 via a wired backhaul (e.g., twisted pair copper cable, fiber optic cable, etc.) and to a second satellite AP 120 via a wireless backhaul (e.g., via respective radios in the controller AP 105 and the second satellite AP 120).

The wireless network 100, like many wireless networks, includes multiple radios to which a client may join to gain access to the wireless network 100. The controller AP 105, first satellite AP 115, and second satellite AP 120 include three radios operating in 2.4 gigahertz (2.4G), 5 gigahertz (5G), and 6 gigahertz (6G) radio bands. A camera client 125 may be connected to the wireless network 100 via a 5G radio of the controller AP 105, a printer client 130 may be connected to the wireless network 100 via a 2.4G radio of the first satellite AP 115, and a cell phone client 135 may be connected to the wireless network 100 via a 5G radio of the second satellite AP 120.

The radio that a client associates to depends on the capabilities of the client. For example, some clients may only support 2.4G while other clients may support all three bands. Given multiple radio choices, a client may not be aware of a radio that will provide better performance than the other available radios. Various factors may be relevant to radio selection for providing an optimized experience for the client. For example, factors that may be relevant may include, but are not limited to: which radio will provide the fastest connection to the WAN 110, how many other clients are connected to the radio, whether a device connected to a satellite AP radio due to the satellite having a stronger signal, and if the satellite has a slower connection to the WAN 110 because of a backhaul connection to the satellite AP.

For example, the cell phone client 135 may have connected to a 5G band radio of the second satellite AP 120 because the cell phone client 135 includes a 5G radio and determined that the second satellite AP 120 signal has higher power because it is in closer physical proximity than the controller AP 105 or the first satellite AP 115. The wired backhaul to the first satellite AP 115 may provide better performance than the wireless backhaul of the second satellite AP 120. The cell phone client 135 would achieve a faster connection to the WAN 110 if it were connected to the first satellite AP 115. However, the cell phone client 135 does not have data available to determine the backhaul of the satellite APs and connects to the second satellite AP 120 based on fronthaul (e.g., strength of the direct connection to the AP) between the cell phone client 135 and the second satellite AP 120. This connection may provide optimized fronthaul connectivity, but not optimized connectivity for the entire path from the cell phone client 135 and the WAN 110 including the backhaul between the second satellite AP 120 and the controller AP 105.

Figure 2:
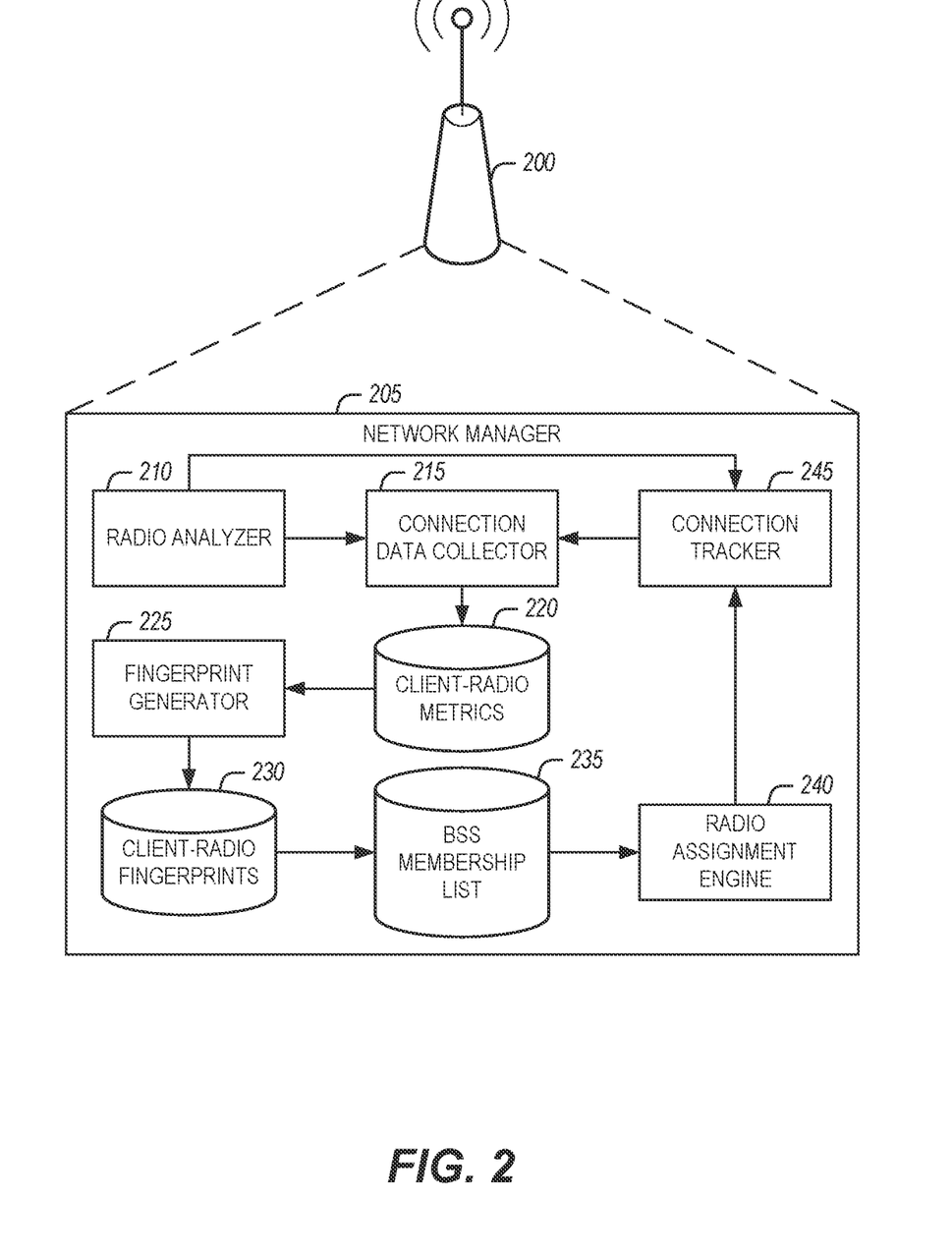
FIG. 2 is a block diagram of an example of an access point including a system for increasing wireless network performance using contextual fingerprinting, according to an embodiment.

FIG. 2 is a block diagram of an example of an access point (AP) 200 including a system 205 for increasing wireless network performance using contextual fingerprinting, according to an embodiment. The AP 200 may be operating in a wireless network (e.g., the wireless network 100 as described in FIG. 1, etc.). The AP may include the system 205. In an example, the system 205 may be a network manager (NM). The system 205 may include a variety of components including a radio analyzer 210, a connection data collector 215, client-radio metrics 220, a fingerprint generator 225, client-radio fingerprints 230, a basic service set (BSS) membership list 235, a radio assignment engine 240, and a connection tracker 245. The system 205 may execute on the controller AP 105 as described in FIG. 1, distributed amongst a set of APs (e.g., the controller AP 105 as described in FIG. 1, the first satellite AP 115 as described in FIG. 1, the second satellite AP 120 as described in FIG. 1, etc.) in the network, off-network such as in a cloud-computing service (e.g., accessed via the WAN 110 as described in FIG. 1, etc.), or in some combination of APs and off-network services.

Returning to the description of FIG. 2, the radio analyzer 210 may analyze radios in the AP 200 and other APs to determine radios available in the network, clients currently connected to the available radios and to which radio the clients are connected, backhauls between APs, etc. The connection data collector 215 collects metrics specific to a client while the client is connected to the network. The collected metrics may be stored in the client-radio metrics 220. The metrics may be collected based on various criteria that provides differing levels of metric granularity for the metric data. In an example, metrics may be collected per client per radio with one set of recorded metrics for each client when it is connected to each radio. In an example where each radio supports multiple operating channels but operation may differ on the same radio between different channels, metrics may be collected per client per radio channel with one set of recorded metrics for each client when it is connected to each channel within each radio. In an example where APs are the same model and are built with a same class of radio where APs are the same model and operation of a client on a particular class of radio is the same on different radios, the metrics may be collected per client per radio class with one set of recorded metrics when the client is connected to each class of radio. Network traffic may vary at different times during the day and might peak in the evening, for example, when increased video streaming traffic may be present. Thus, in an example, metrics may be collected per client per radio per time of day to record segregated metrics for a client based on the time of day to provide insights into usage patterns.

The connection data collector 215 collects the metrics to track how the client is operating/performing via a current location of the client within the network. The location may be estimated as an approximate distance from a radio based on signal strength of the connection. For example, a stronger signal may indicate that the client is closer to the radio while a weaker signal my indicate that the client is further from the radio. Signal strength may be measured, by way of example and not limitation, based on upstream data frame power as measured by the AP 200 radio when data packets are received from the client, downstream data frame power as measured by a client radio when data packets are transmitted to the client, downstream beacon power as measured by the client radio when beacons are transmitted by the AP 200, upstream probe power as measured by the AP 200 radio in response to an 802.11k request by the client, etc.

The collected metrics may include a physical rate (e.g., speed at which bits are transmitted). An upstream physical rate is measured by the AP 200 radio when a client sends a data frame to the AP 200 and the data frame is successfully received. A downstream physical rate is determined by the AP 200 radio upon receipt of an acknowledgement frame (ACK) from the client that indicates that the last downstream frame was successfully received by the client. The physical rate of that last successful downstream frame may be the downstream physical rate of the connection for that instant in time. The upstream and downstream physical rates are affected by various factors such as client and AP characteristics, protocol specifications, and environmental factors such as distance between the AP 200 and the client, presence of outside interference, etc.

Thus, the signal strength and physical rate may be used to track how the client is operating/performing. Over time the connection data collector 215 records the physical rate for clients connected to radios at various locations. The physical rate the client is achieving at a particular location while connected to a particular radio may be used to approximate a physical rate the client will achieve at the location if it were to connect to the radio in the future. The metrics may be measured periodically (e.g. every 10 seconds, etc.) by the connection data collector.

The metrics may include a packet count. Clients may not be active on the network at all times and may transition to an idle or low power mode when not in use. In this mode, the client will transmit at low data rates to keep the connection alive. Clients that are not actively transmitting or receiving data may go into sleep/power saving mode and may only transmit enough data to keep the connection alive. Clients in this mode may skew the metrics being collected with misleading data. Thus, periodic metric samples may be ignored when it is determined that a client is not transmitting or transmitting at a very low rate simply to keep the connection alive to avoid skewing the client data. The packet count can be used to understand activity level of the client. An inactive client does not accurately reflect how the client is performing/operating on the network so other metrics may be ignored.

The metrics may include packet errors and retransmissions. These metrics may be used as an indication of congestion or an indication that too many clients are connected to a particular radio. Packet errors and retransmissions may be used by the radio assignment engine 240 to direct clients to other radios to relieve congestion.

Along with metrics collected while a client is connected/associated to a particular radio, the connection data collector 215 may perform unassociated station (STA) received channel power indicator (RCPI) measurements as defined in a multi-AP specification (e.g., Institute of Electrical and Electronics Engineers (IEEE) standard 802.11k-2008). The unassociated STA RCPI measurements are client signal strength measurements by radios other than the radio to which the client is currently associated. In an example, AP 200 radios may measure power of data frames transmitted by clients not currently associated and may report the measured power value to the radio analyzer 210 and the radio assignment engine 240 may use the power measured power values to compare the current location of the client relative to other radios available in the network. In an example, the radio assignment engine 240 may use the STA RCPI measurements to compare the current location of the client relative to other radios available in the network. Because not all clients are stationary, a client that is physically changing location within the network may experience decreased performance as it moves away from the radio it is currently associated to and may experience a predictable performance increase as it moves closer to a different radio. As used herein, this capability is referred to as a client refresh.

Client refresh is used as a lookup into the metrics collected and recorded in the client-radio metrics. Based on the client refresh, there may be recorded metrics for the client regarding how it was operating at the potential new location on a different radio in the past. The radio assignment engine 240 may compare performance of the client as currently operating on the current radio to predicted performance of the client on a different radio. The radio assignment engine 240 may utilize the comparison to manage the client according to its radio assignment policy. For example, if the policy is to maximize client throughput to the internet and the recorded metrics for a different radio indicate better throughput, the radio assignment engine may direct the client to the other radio if a connection to the other radio is predicted to result is higher throughout than the current connection.

The system maintains a basic service set (BSS) membership list 235 that is a collection of tables with each client-radio association having its own table. The tables contain information/metrics pertinent to how a client is performing while associated to a radio. For example, the BSS membership list 235 may be used by the radio assignment engine 240 to determine that the cell phone client 135 as described in FIG. 1 would achieve a better connection to the WAN 110 of FIG. 1 if it was directed to a radio on the first satellite AP 115 of FIG. 1.

The fingerprint generator 225 may evaluate client-radio metrics to generate a fingerprint for the client connected to a radio. For example, the fingerprint may include performance metrics (e.g., performance metric samples, average values for performance metrics, median values for performance metrics, etc.) for the client while the client is connected to the radio, when connected to a particular radio under relevant conditions, etc. For example, if the tables have per-client-per-radio-per-channel-number-per-channel-bandwidth-per-operating-standard scope then relevant conditions may be channel number, channel bandwidth, and operating standard (e.g., IEEE operating standard, etc.). The fingerprint may be a table or other data element that includes the metrics from the client-radio metrics 220 that are relevant to predicting client operational attributes when connected to a particular radio. The client-radio fingerprints 230 may be included in the BSS membership list 235 and may be used by the radio assignment engine 240 to make radio assignments for the client. For example, a client may be directed to transition from a current radio to a different radio based on predicted higher throughput based on a fingerprint for the client in the BSS membership list 235 describing client operation when connected to the different radio. The fingerprint generator 225 generates a behavioral fingerprint from the client-radio metrics 220 for a client-radio association.

The connection data collector 215 collects and records metrics for each client that associates to each radio. As previously noted, the metrics include, but are not limited to, signal strength of the client measured at the radio, downstream physical rate (e.g., toward client), upstream physical rate (e.g., from client), downstream/upstream packet count, packet errors, retransmissions, etc. By recording these metrics regarding how the client is operating while connected to a radio from a certain location (e.g. signal strength), the fingerprint generator utilizes the client-radio metrics 220 to generate the client-radio fingerprints 230 that are used by the radio assignment engine 240 to manage the client in the future with respect to the NM policies as the client moves throughout the network.

The radio assignment engine 240 evaluates how a client had been operating at a location when connected to a radio (e.g., based on a client-radio fingerprint for the location) to predict how the client will operate at the radio at this location or a similar location in the future. Evaluation of the client-radio fingerprints 230 (e.g., based on past performance) enables the radio assignment engine 240 to provide more accurate predictions of future client operation based on actual observed/recorded past operation.

The radio assignment engine 240 may deny membership to a specific radio because there are already several clients connected to the specific radio and other radios have more capacity due to lower membership (e.g., congestion, etc.). The radio assignment engine 240 manages individual clients (e.g., specifying where they can and cannot connect, etc.) and maintains optimal performance for a mix of clients on the network.

Clients may move to a new location and there may not be a client-radio fingerprint for a client-radio pair to which a client may connect. In this case, radio assignment engine 240 may utilize other client-radio fingerprints for the client on a different radio or other clients on the prospective radio. The radio assignment engine 240 may extrapolate data from the client-radio fingerprints to estimate performance for the client at the prospective radio based on the actual performance achieved at a slightly different location or at the radio by a similar device. The radio assignment engine 240 may select a similar client-radio fingerprint based on attributes of the radio and the client. For example, the client may be a generation 3 ACME brand cellular phone and there may be a client-radio fingerprint for another generation 3 ACME brand cellular phone and the prospective radio in the BSS membership list that may be selected based on similarity between the client devices. The selection may evaluate attributes including, but not limited to, device class, device type, radio model, radio generation, radio age, radio output power, cellular phone operating system, etc.

If there are no similar client-radio fingerprints available, generic tables may be referenced to make a performance prediction for the client at the prospective radio. The generic tables may be based on mathematical physical rate calculations derived from 802.11 data rate tables. The generic tables provide approximations of a physical rate a client may achieve at a particular signal level.

The connection tracker 245 may track the client as it moves throughout the network and may work in conjunction with the connection data collector 215 to continually collect and update the client-radio metrics for the client. Thus, additional client-radio fingerprints are generated and existing client-radio fingerprints are refined as the client operates within the network.

Figure 3:
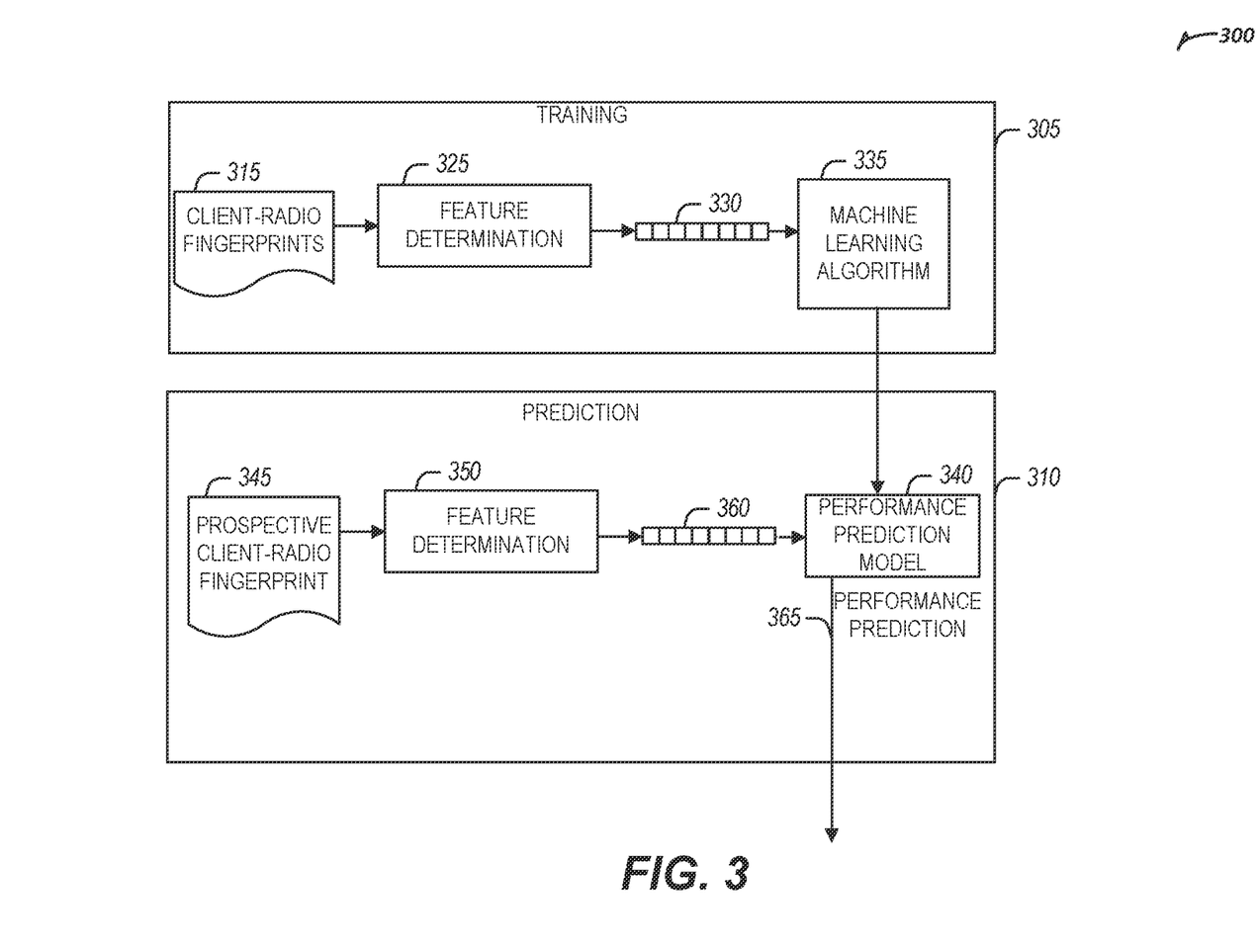
FIG. 3 illustrates an example machine learning component for response generation for increasing wireless network performance using contextual fingerprinting, according to an embodiment.

FIG. 3 illustrates an example machine learning component 300 for response generation for predicted event-driven interactions, according to some embodiments. The machine learning component 300 may be used by the radio assignment engine 240 as described in FIG. 2. The machine learning component utilizes a training module 305 and a prediction module 310. Training module 305 feeds client-radio fingerprints 315 into feature determination module 325 which determines one or more features 330 from this information. Features 330 are a subset of the information input and is information determined to be predictive of operation of a client at a radio based on client-radio metrics. Examples include one or more of: physical rates, throughput, packet counts, packet errors and retransmissions, signal strength, etc.

The machine learning algorithm 335 produces a performance prediction model 340 based upon the features and feedback associated with those features. For example, the features associated with operation of a client using a radio connection of an AP may be used as training data. As noted above, the performance prediction model 340 may be for the entire system (e.g., built of training data accumulated throughout the entire system, regardless of a client at a specific radio (e.g., to build a generic performance table, etc.)), or may be built specific for each client, each radio, or client and radio pair.

In the prediction module 310, a prospective client-radio fingerprint 345 may be input to the feature determination module 350. Feature determination module 350 may determine the same set of features or a different set of features as feature determination module 325. In some examples, feature determination module 350 and 325 are the same module. Feature determination module 350 produces features 360, which are input into the performance prediction model 340 to perform performance prediction 365. The training module 305 may operate in an offline manner to train the performance prediction model 340. The prediction module 310, however, may be designed to operate in an online manner as each client-radio fingerprint is evaluated as client movements occur.

It should be noted that the performance prediction model 340 may be periodically updated via additional training and/or user feedback. The user feedback may be feedback from users that provide explicit feedback (e.g., responses to questions about whether performance increased due to a radio change, etc.) or may be automated feedback based on updated client-radio metrics received after the client device establishes a connection to a prospective radio. For example, a user may provide an explicit response indicating the real-world performance did not increase based on a transition to a prospective radio (e.g., the performance increase was imperceptible by the user, declined, etc.) and the response may be used as additional training data for updating the performance prediction model 340.

The machine learning algorithm 335 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, and hidden Markov models. Examples of unsupervised learning algorithms include expectation-maximization algorithms, vector quantization, and information bottleneck method. In an example embodiment, a multi-class logistical regression model is used.

Figure 6:
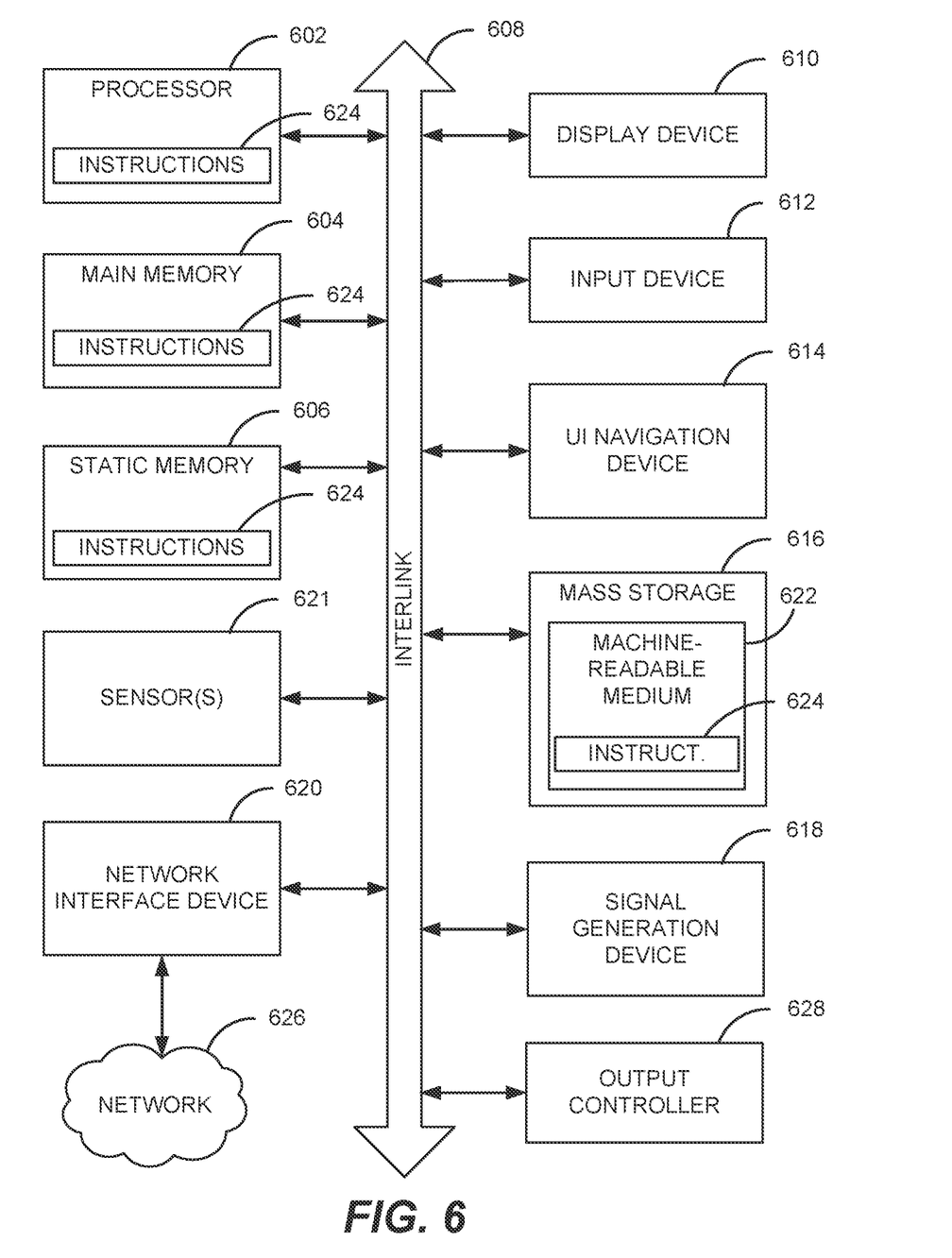
FIG. 6 is a block diagram illustrating an example of a machine upon which one or more embodiments may be implemented.

The system 205 as described in FIG. 2 and the machine learning component 300 may be implemented on one or more computing devices, such as machine 600 of FIG. 6. As such, some of the components of FIG. 2 may communicate with each other via inter-process communication and other local communications techniques (e.g., shared memory, pipes, buffers, queues). In other examples, the components of FIG. 2 may be parts of different services or systems and thus the components may communicate with each other through a computer network using computer networking protocols.

Figure 4:
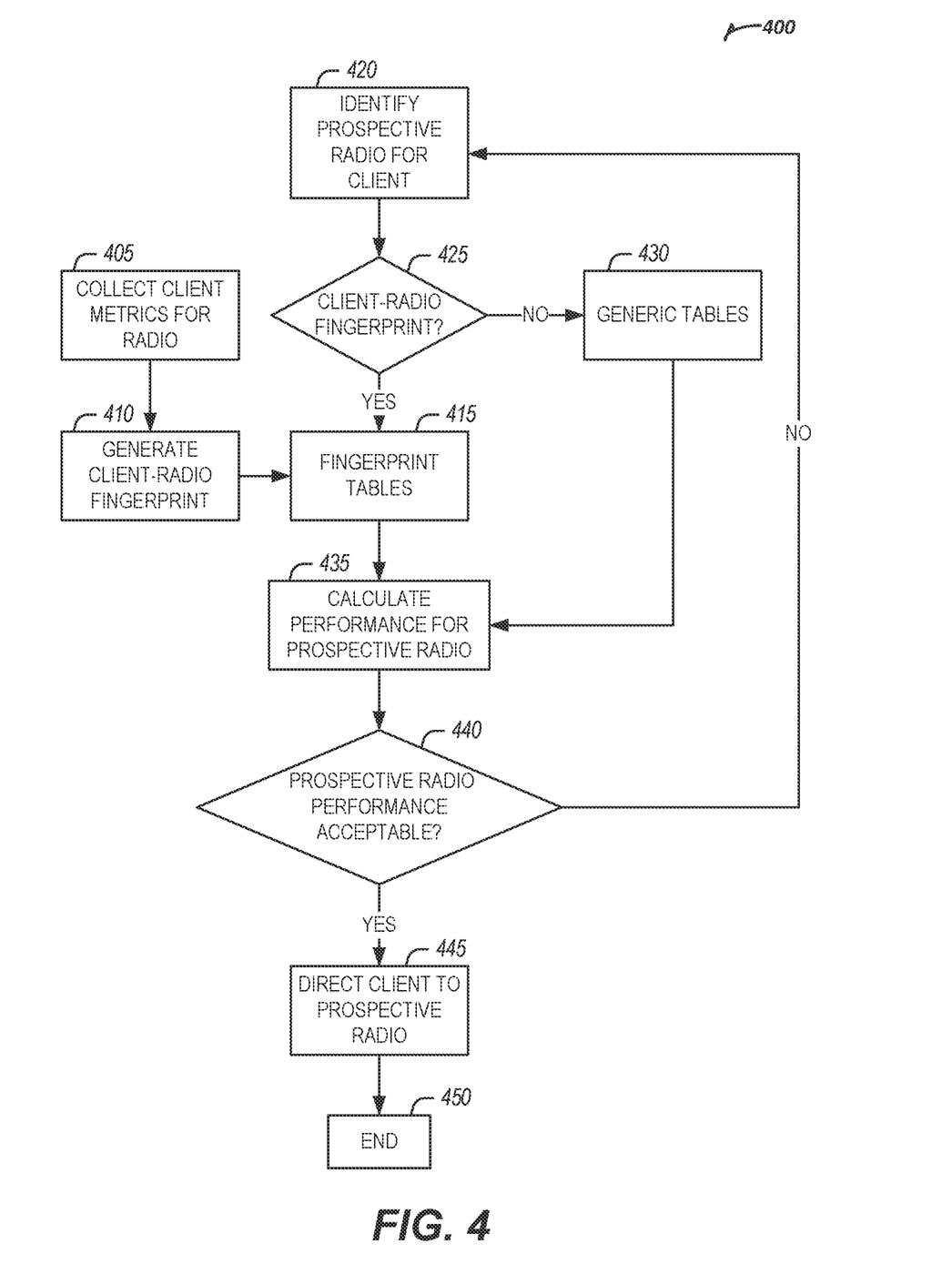
FIG. 4 illustrates a flow diagram of an example of a process for increasing wireless network performance using contextual fingerprinting, according to an embodiment.

FIG. 4 illustrates a flow diagram of an example of a process 400 for increasing wireless network performance using contextual fingerprinting, according to an embodiment. The process 400 may provide features as described in FIGS. 1 through 3.

Client metrics may be collected for a client device-access radio pair that includes a wireless network interface of a client device and an access radio (or another device) of a wireless network associated (e.g., connected via) with the client device (e.g., at operation 405). A fingerprint may be generated for the client radio pair (e.g., at operation 410). The fingerprint may be generated as a table in a collection of client-radio fingerprints (e.g., at operation 415).

A prospective radio may be identified for a client (e.g., at operation 420). It may be determined if there is a client-radio fingerprint available for the client-prospective radio pair (e.g., at decision operation 425). If so, the fingerprint is retrieved from the fingerprint tables (e.g., at operation 415). In an example, an exact match may not be identified and a fingerprint that most closely matches the client-prospective radio pair may be selected using a matching algorithm (e.g., fuzzy logic, fit function, etc.). If a client-radio fingerprint is not available for the client-prospective radio pair, a generic table may be obtained based on client and radio attributes.

The fingerprint or generic tables are used to calculate a performance estimate for the client when associated with the prospective radio (e.g., at operation 435). It may be determined if the estimated performance is acceptable (e.g., compatible with, etc.) a radio selection policy (e.g., at decision operation 440). For example, estimated performance metrics of the estimated performance may be compared to current metrics collected from the client associated with a current radio to determine if the metrics of the prospective radio are closer to reference metrics (e.g., as defined by the radio selection policy) than the current radio. In an example, the estimated performance metrics may be compared to those of other available radios to determine if the prospective radio estimated metrics more closely match the reference metrics than estimated metrics for the other available radios.

If the estimated performance of the prospective radio does not meet requirements of the radio selection policy (e.g., at decision operation 440), a different prospective radio may be identified (e.g., at operation 420). If the estimated performance of the prospective radio is determined to be acceptable per the radio selection policy (e.g., as determined at decision operation 440), the client is directed to the prospective radio (e.g., at operation 445) and the process 400 ends (e.g., at operation 450).

In an example, the operations 405, 410, and 415 may be a stand-alone process that is separate from the process 400 for identification of prospective radios. In the example, it may be determined that there is a client-radio fingerprint available for the client-prospective radio pair (e.g., at decision operation 425) when fingerprinting collected by the stand-alone process is considered valid. Otherwise, generic tables may be used (e.g., at operation 430). For example, there may be a table of data for client C with regard to radio R. The process 400 may execute when path loss between C and R is X decibels (dB). If there is sufficient data for C with regard to R at X then the fingerprint data is used (e.g., at operation 430 because a valid fingerprint exists at decision 425) otherwise a generic table is used (e.g., at operation 430). In an example, if a number of data points in a fingerprint table for C with regard to R at X is a number T above a threshold, the value of the fingerprint table that corresponds to X may be used alone. If T is below the threshold, a weighted average of what the fingerprint table value that corresponds to X and generic table values that correspond to X may be used. For example if a number of data points is one-half T, a linear average of the fingerprint table value and generic tables values may be used to calculate performance (e.g., at operation 435).

Figure 5:
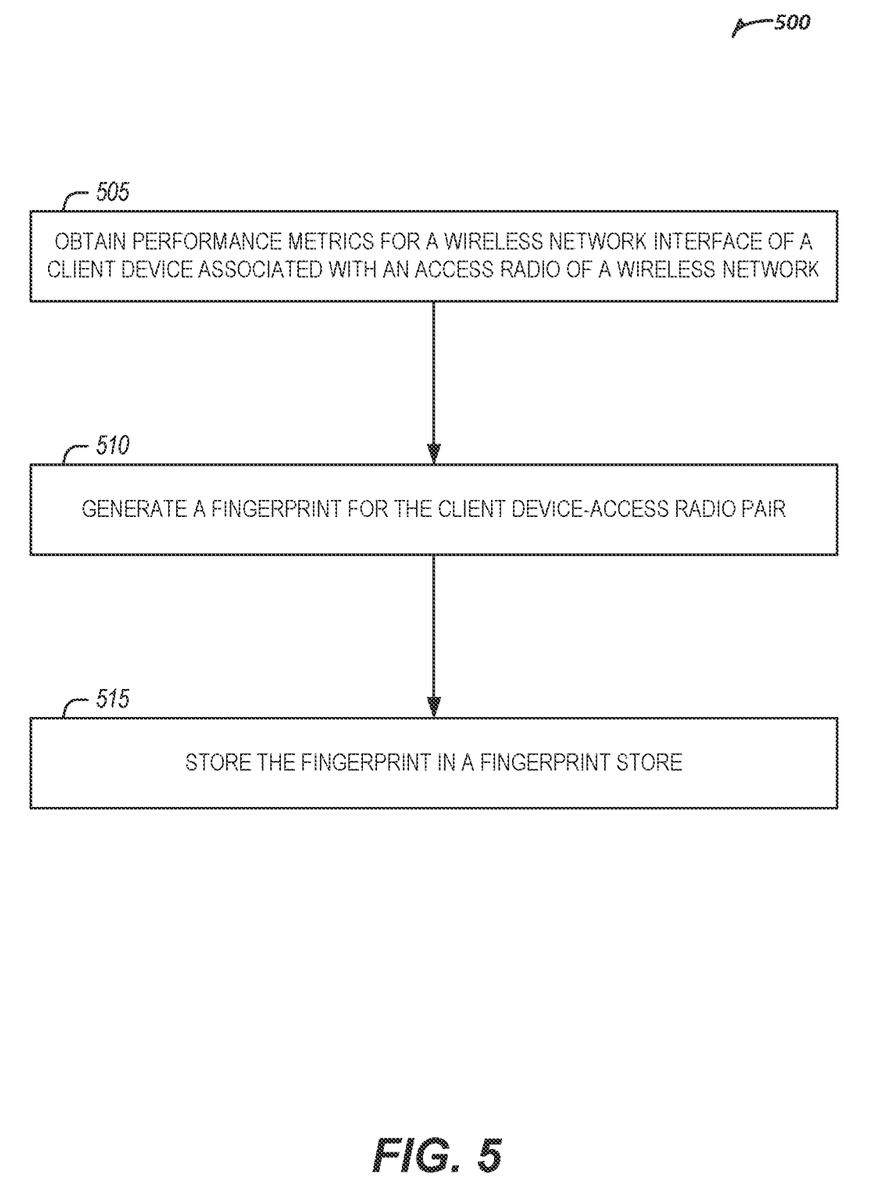
FIG. 5 illustrates an example of a method for increasing wireless network performance using contextual fingerprinting, according to an embodiment.

FIG. 5 illustrates an example of a method 500 for increasing wireless network performance using contextual fingerprinting, according to an embodiment. The method 500 may provide features as described in FIGS. 1 through 4.

Performance metrics may be obtained for a client device-access radio pair that includes a wireless network interface of a client device and an access radio of a wireless network associated with the client device (e.g., at operation 505). In an example, the performance metrics may include at least one of a physical rate of the wireless network interface, throughput of the wireless network interface, packet error count of the wireless network interface, packet retransmit count of the wireless network interface, or packet count of the wireless network interface.

A fingerprint may be generated for the client device-access radio pair (e.g., at operation 510). The fingerprint may be stored in a fingerprint store for the wireless network (e.g., at operation 515). In an example, the fingerprint store may be distributed to wireless access points of the wireless network.

In an example, it may be identified that the client device is within operating range of the access radio. Estimated performance metrics may be calculated for the wireless network interface using the fingerprint. Current performance metrics may be obtained for a current access radio to which the client device is currently associated. The estimated performance metrics and the current performance metrics may be compared to a radio selection policy to determine that estimated performance are a closer match to the radio selection policy than the current performance metrics and the client device maybe directed to the access radio based on the comparison.

In an example, it may be identified that a second client device is within operating range of the access radio. It may be determined that a second client device-access radio fingerprint does not exist in the fingerprint store. Attributes of the second client device may be obtained and the fingerprint may be selected from the fingerprint store using the attributes. Estimated performance metrics may be calculated for the wireless network interface of the second client device using the fingerprint. The estimated performance metrics may be compared to a radio selection policy to determine that the estimated performance metrics are within a threshold of at least one metric of the radio selection policy and the client device may be directed to the access radio based on the comparison.

In an example, it may be identified that a second client device is within operating range of the access radio. It may be determined that a second client device-access radio fingerprint does not exist in the fingerprint store. Attributes of the second client device may be obtained and a performance table may be selected from a performance table store of the wireless network using the attributes. Estimated performance metrics may be calculated for a wireless network interface of the second client device using the performance table. The estimated performance metrics may be compared to a radio selection policy to determine that the estimated performance metrics are within a threshold of at least one metric of the radio selection policy and the client device may be directed to the access radio based on the comparison.

In an example, first features may be extracted from a set of client-access radio pair fingerprints. The first features may be provided as input to a machine learning algorithm to train a performance prediction model. Second features may be extracted from the client device-access fingerprint. The second features may be applied to the performance prediction model to produce a performance prediction for the client device when connected to the access radio and the client device may be directed to the access radio based on performance metrics included in the performance prediction.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a system for context-based behavior fingerprinting for wireless network radio selection comprising: at least one processor; and memory including instructions that, when executed by the at least one processor, cause the at least one processor to perform operations to: obtain performance metrics a client device-access radio pair that includes a wireless network interface of a client device and an access radio of a wireless network associated with the client device; generate a fingerprint for the client device-access radio pair; and store the fingerprint in a fingerprint store for the wireless network.

In Example 2, the subject matter of Example 1 wherein, the performance metrics include at least one of a physical rate of the wireless network interface, throughput of the wireless network interface, packet error count of the wireless network interface, packet retransmit count of the wireless network interface, or packet count of the wireless network interface.

In Example 3, the subject matter of Examples 1-2 wherein, the fingerprint store is distributed to wireless access points of the wireless network.

In Example 4, the subject matter of Examples 1-3 includes, the memory further comprising instructions that, when executed by the at least one processor, cause the at least one processor to perform operations to: identify that the client device is within operating range of the access radio; calculate estimated performance metrics for the wireless network interface using the fingerprint; obtain current performance metrics for a current access radio to which the client device is currently associated; compare the estimated performance metrics and the current performance metrics to a radio selection policy to determine that estimated performance are a closer match to the radio selection policy than the current performance metrics; and direct the client device to the access radio based on the comparison.

In Example 5, the subject matter of Examples 1-4 includes, the memory further comprising instructions that, when executed by the at least one processor, cause the at least one processor to perform operations to: identify that a second client device is within operating range of the access radio; determine that a second client device-access radio fingerprint does not exist in the fingerprint store; obtain attributes of the second client device; select the fingerprint from the fingerprint store using the attributes; calculate estimated performance metrics for the wireless network interface of the second client device using the fingerprint; compare the estimated performance metrics to a radio selection policy to determine that the estimated performance metrics are within a threshold of at least one metric of the radio selection policy; and direct the client device to the access radio based on the comparison.

In Example 6, the subject matter of Examples 1-5 includes, the memory further comprising instructions that, when executed by the at least one processor, cause the at least one processor to perform operations to: identify that a second client device is within operating range of the access radio; determine that a second client device-access radio fingerprint does not exist in the fingerprint store; obtain attributes of the second client device; select a performance table from a performance table store of the wireless network using the attributes; calculate estimated performance metrics for a wireless network interface of the second client device using the performance table; compare the estimated performance metrics to a radio selection policy to determine that the estimated performance metrics are within a threshold of at least one metric of the radio selection policy; and direct the client device to the access radio based on the comparison.

In Example 7, the subject matter of Examples 1-6 includes, the memory further comprising instructions that, when executed by the at least one processor, cause the at least one processor to perform operations to: extract first features from a set of client-access radio pair fingerprints; provide the first features as input to a machine learning algorithm to train a performance prediction model; extract second features from the client device-access fingerprint, apply the second features to the performance prediction model to produce a performance prediction for the client device when connected to the access radio; and direct the client device to the access radio based on performance metrics included in the performance prediction.

Example 8 is a method for context-based behavior fingerprinting for wireless network radio selection comprising: obtaining performance metrics for a client device-access radio pair that includes a wireless network interface of a client device and an access radio of a wireless network associated with the client device; generating a fingerprint for the client device-access radio pair; and storing the fingerprint in a fingerprint store for the wireless network.

In Example 9, the subject matter of Example 8 wherein, the performance metrics include at least one of a physical rate of the wireless network interface, throughput of the wireless network interface, packet error count of the wireless network interface, packet retransmit count of the wireless network interface, or packet count of the wireless network interface.

In Example 10, the subject matter of Examples 8-9 wherein, the fingerprint store is distributed to wireless access points of the wireless network.

In Example 11, the subject matter of Examples 8-10 includes, identifying that the client device is within operating range of the access radio; calculating estimated performance metrics for the wireless network interface using the fingerprint; obtaining current performance metrics for a current access radio to which the client device is currently associated; comparing the estimated performance metrics and the current performance metrics to a radio selection policy to determine that estimated performance are a closer match to the radio selection policy than the current performance metrics; and directing the client device to the access radio based on the comparison.

In Example 12, the subject matter of Examples 8-11 includes, identifying that a second client device is within operating range of the access radio; determining that a second client device-access radio fingerprint does not exist in the fingerprint store; obtaining attributes of the second client device; selecting the fingerprint from the fingerprint store using the attributes; calculating estimated performance metrics for the wireless network interface of the second client device using the fingerprint; comparing the estimated performance metrics to a radio selection policy to determine that the estimated performance metrics are within a threshold of at least one metric of the radio selection policy; and directing the client device to the access radio based on the comparison.

In Example 13, the subject matter of Examples 8-12 includes, identifying that a second client device is within operating range of the access radio; determining that a second client device-access radio fingerprint does not exist in the fingerprint store; obtaining attributes of the second client device; selecting a performance table from a performance table store of the wireless network using the attributes; calculating estimated performance metrics for a wireless network interface of the second client device using the performance table; comparing the estimated performance metrics to a radio selection policy to determine that the estimated performance metrics are within a threshold of at least one metric of the radio selection policy; and directing the client device to the access radio based on the comparison.

In Example 14, the subject matter of Examples 8-13 includes, extracting first features from a set of client-access radio pair fingerprints; providing the first features as input to a machine learning algorithm to train a performance prediction model; extracting second features from the client device-access fingerprint; applying the second features to the performance prediction model to produce a performance prediction for the client device when connected to the access radio; and directing the client device to the access radio based on performance metrics included in the performance prediction.

Example 15 is at least one non-transitory machine-readable medium including instructions for context-based behavior fingerprinting for wireless network radio selection including instructions that, when executed by at least one processor, cause the at least one processor to perform operations to: obtain performance metrics for a client device-access radio pair that includes a wireless network interface of a client device and an access radio of a wireless network associated with the client device; generate a fingerprint for the client device-access radio pair; and store the fingerprint in a fingerprint store for the wireless network.

In Example 16, the subject matter of Example 15 wherein, the performance metrics include at least one of a physical rate of the wireless network interface, throughput of the wireless network interface, packet error count of the wireless network interface, packet retransmit count of the wireless network interface, or packet count of the wireless network interface.

In Example 17, the subject matter of Examples 15-16 wherein, the fingerprint store is distributed to wireless access points of the wireless network.

In Example 18, the subject matter of Examples 15-17 includes, instructions that, when executed by the at least one processor, cause the at least one processor to perform operations to: identify that the client device is within operating range of the access radio; calculate estimated performance metrics for the wireless network interface using the fingerprint; obtain current performance metrics for a current access radio to which the client device is currently associated; compare the estimated performance metrics and the current performance metrics to a radio selection policy to determine that estimated performance are a closer match to the radio selection policy than the current performance metrics; and direct the client device to the access radio based on the comparison.

In Example 19, the subject matter of Examples 15-18 includes, instructions that, when executed by the at least one processor, cause the at least one processor to perform operations to: identify that a second client device is within operating range of the access radio; determine that a second client device-access radio fingerprint does not exist in the fingerprint store; obtain attributes of the second client device; select the fingerprint from the fingerprint store using the attributes; calculate estimated performance metrics for the wireless network interface of the second client device using the fingerprint; compare the estimated performance metrics to a radio selection policy to determine that the estimated performance metrics are within a threshold of at least one metric of the radio selection policy; and direct the client device to the access radio based on the comparison.

In Example 20, the subject matter of Examples 15-19 includes, instructions that, when executed by the at least one processor, cause the at least one processor to perform operations to: identify that a second client device is within operating range of the access radio; determine that a second client device-access radio fingerprint does not exist in the fingerprint store; obtain attributes of the second client device; select a performance table from a performance table store of the wireless network using the attributes; calculate estimated performance metrics for a wireless network interface of the second client device using the performance table; compare the estimated performance metrics to a radio selection policy to determine that the estimated performance metrics are within a threshold of at least one metric of the radio selection policy; and direct the client device to the access radio based on the comparison.

In Example 21, the subject matter of Examples 15-20 includes, instructions that, when executed by the at least one processor, cause the at least one processor to perform operations to: extract first features from a set of client-access radio pair fingerprints; provide the first features as input to a machine learning algorithm to train a performance prediction model; extract second features from the client device-access fingerprint; apply the second features to the performance prediction model to produce a performance prediction for the client device when connected to the access radio; and direct the client device to the access radio based on performance metrics included in the performance prediction.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for context-based behavior fingerprinting for wireless network radio selection comprising:
   at least one processor; and
   memory including instructions that, when executed by the at least one processor, cause the at least one processor to perform operations to:
   obtain performance metrics for a client device-access radio pair that includes a wireless network interface of a client device and an access radio of a wireless network associated with the client device;
   generate a fingerprint for the client device-access radio pair; and
   store the fingerprint in a fingerprint store for the wireless network.

2. The system of claim 1, wherein the performance metrics include at least one of a physical rate of the wireless network interface, throughput of the wireless network interface, packet error count of the wireless network interface, packet retransmit count of the wireless network interface, or packet count of the wireless network interface.

3. The system of claim 1, wherein the fingerprint store is distributed to wireless access points of the wireless network.

4. The system of claim 1, the memory further comprising instructions that, when executed by the at least one processor, cause the at least one processor to perform operations to:
   identify that the client device is within operating range of the access radio;
   calculate estimated performance metrics for the wireless network interface using the fingerprint;
   obtain current performance metrics for a current access radio to which the client device is currently associated;
   compare the estimated performance metrics and the current performance metrics to a radio selection policy to determine that estimated performance are a closer match to the radio selection policy than the current performance metrics; and
   direct the client device to the access radio based on the comparison.

5. The system of claim 1, the memory further comprising instructions that, when executed by the at least one processor, cause the at least one processor to perform operations to:
   identify that a second client device is within operating range of the access radio;
   determine that a second client device-access radio fingerprint does not exist in the fingerprint store;
   obtain attributes of the second client device;
   select the fingerprint from the fingerprint store using the attributes;
   calculate estimated performance metrics for the wireless network interface of the second client device using the fingerprint;
   compare the estimated performance metrics to a radio selection policy to determine that the estimated performance metrics are within a threshold of at least one metric of the radio selection policy; and
   direct the client device to the access radio based on the comparison.

6. The system of claim 1, the memory further comprising instructions that, when executed by the at least one processor, cause the at least one processor to perform operations to:
   identify that a second client device is within operating range of the access radio;
   determine that a second client device-access radio fingerprint does not exist in the fingerprint store;
   obtain attributes of the second client device;
   select a performance table from a performance table store of the wireless network using the attributes;
   calculate estimated performance metrics for a wireless network interface of the second client device using the performance table;
   compare the estimated performance metrics to a radio selection policy to determine that the estimated performance metrics are within a threshold of at least one metric of the radio selection policy; and
   direct the client device to the access radio based on the comparison.

7. The system of claim 1, the memory further comprising instructions that, when executed by the at least one processor, cause the at least one processor to perform operations to:
   extract first features from a set of client-access radio pair fingerprints;
   provide the first features as input to a machine learning algorithm to train a performance prediction model;
   extract second features from the client device-access fingerprint;
   apply the second features to the performance prediction model to produce a performance prediction for the client device when connected to the access radio; and
   direct the client device to the access radio based on performance metrics included in the performance prediction.

8. A method for context-based behavior fingerprinting for wireless network radio selection comprising:
   obtaining performance metrics for a client device-access radio pair that includes a wireless network interface of a client device and an access radio of a wireless network associated with the client device;
   generating a fingerprint for the client device-access radio pair; and
   storing the fingerprint in a fingerprint store for the wireless network.

9. The method of claim 8, wherein the performance metrics include at least one of a physical rate of the wireless network interface, throughput of the wireless network interface, packet error count of the wireless network interface, packet retransmit count of the wireless network interface, or packet count of the wireless network interface.

10. The method of claim 8, wherein the fingerprint store is distributed to wireless access points of the wireless network.

11. The method of claim 8, further comprising:
   identifying that the client device is within operating range of the access radio;
   calculating estimated performance metrics for the wireless network interface using the fingerprint;
   obtaining current performance metrics for a current access radio to which the client device is currently associated;
   comparing the estimated performance metrics and the current performance metrics to a radio selection policy to determine that estimated performance are a closer match to the radio selection policy than the current performance metrics; and
directing the client device to the access radio based on the comparison.

12. The method of claim 8, further comprising:
identifying that a second client device is within operating range of the access radio;
determining that a second client device-access radio fingerprint does not exist in the fingerprint store;
obtaining attributes of the second client device;
selecting the fingerprint from the fingerprint store using the attributes;
calculating estimated performance metrics for the wireless network interface of the second client device using the fingerprint;
comparing the estimated performance metrics to a radio selection policy to determine that the estimated performance metrics are within a threshold of at least one metric of the radio selection policy; and
directing the client device to the access radio based on the comparison.

13. The method of claim 8, further comprising:
identifying that a second client device is within operating range of the access radio;
determining that a second client device-access radio fingerprint does not exist in the fingerprint store;
obtaining attributes of the second client device;
selecting a performance table from a performance table store of the wireless network using the attributes;
calculating estimated performance metrics for a wireless network interface of the second client device using the performance table;
comparing the estimated performance metrics to a radio selection policy to determine that the estimated performance metrics are within a threshold of at least one metric of the radio selection policy; and
directing the client device to the access radio based on the comparison.

14. The method of claim 8, further comprising:
extracting first features from a set of client-access radio pair fingerprints;
providing the first features as input to a machine learning algorithm to train a performance prediction model;
extracting second features from the client device-access fingerprint;
applying the second features to the performance prediction model to produce a performance prediction for the client device when connected to the access radio; and
directing the client device to the access radio based on performance metrics included in the performance prediction.

15. At least one non-transitory machine-readable medium including instructions for context-based behavior fingerprinting for wireless network radio selection including instructions that, when executed by at least one processor, cause the at least one processor to perform operations to:
obtain performance metrics for a client device-access radio pair that includes a wireless network interface of a client device and an access radio of a wireless network associated with the client device;
generate a fingerprint for the client device-access radio pair; and
store the fingerprint in a fingerprint store for the wireless network.

16. The at least one non-transitory machine-readable medium of claim 15, wherein the performance metrics include at least one of a physical rate of the wireless network interface, throughput of the wireless network interface, packet error count of the wireless network interface, packet retransmit count of the wireless network interface, or packet count of the wireless network interface.

17. The at least one non-transitory machine-readable medium of claim 15, wherein the fingerprint store is distributed to wireless access points of the wireless network.

18. The at least one non-transitory machine-readable medium of claim 15, further comprising instructions that, when executed by the at least one processor, cause the at least one processor to perform operations to:
identify that the client device is within operating range of the access radio;
calculate estimated performance metrics for the wireless network interface using the fingerprint;
obtain current performance metrics for a current access radio to which the client device is currently associated;
compare the estimated performance metrics and the current performance metrics to a radio selection policy to determine that estimated performance are a closer match to the radio selection policy than the current performance metrics; and
direct the client device to the access radio based on the comparison.

19. The at least one non-transitory machine-readable medium of claim 15, further comprising instructions that, when executed by the at least one processor, cause the at least one processor to perform operations to:
identify that a second client device is within operating range of the access radio;
determine that a second client device-access radio fingerprint does not exist in the fingerprint store;
obtain attributes of the second client device;
select the fingerprint from the fingerprint store using the attributes;
calculate estimated performance metrics for the wireless network interface of the second client device using the fingerprint;
compare the estimated performance metrics to a radio selection policy to determine that the estimated performance metrics are within a threshold of at least one metric of the radio selection policy; and
direct the client device to the access radio based on the comparison.

20. The at least one non-transitory machine-readable medium of claim 15, further comprising instructions that, when executed by the at least one processor, cause the at least one processor to perform operations to:
identify that a second client device is within operating range of the access radio;
determine that a second client device-access radio fingerprint does not exist in the fingerprint store;
obtain attributes of the second client device;
select a performance table from a performance table store of the wireless network using the attributes;
calculate estimated performance metrics for a wireless network interface of the second client device using the performance table;
compare the estimated performance metrics to a radio selection policy to determine that the estimated performance metrics are within a threshold of at least one metric of the radio selection policy; and
direct the client device to the access radio based on the comparison.

21. The at least one non-transitory machine-readable medium of claim 15, further comprising instructions that, when executed by the at least one processor, cause the at least one processor to perform operations to:
- extract first features from a set of client-access radio pair fingerprints;
- provide the first features as input to a machine learning algorithm to train a performance prediction model;
- extract second features from the client device-access fingerprint;
- apply the second features to the performance prediction model to produce a performance prediction for the client device when connected to the access radio; and
- direct the client device to the access radio based on performance metrics included in the performance prediction.

* * * * *